United States Patent
Buerk

(10) Patent No.: US 9,240,971 B2
(45) Date of Patent: Jan. 19, 2016

(54) AUTOMATED MANAGEMENT OF GENERALIZED CENTRAL NAME SERVICES BY DISTRIBUTED REMOTE DEVICES

(71) Applicant: LabTech LLC, Tampa, FL (US)

(72) Inventor: Gregory Francis Buerk, Whitehouse, OH (US)

(73) Assignee: Labtech, LLC, Tampa, FL (US)

( * ) Notice: Subject to any disclaimer, the term of this patent is extended or adjusted under 35 U.S.C. 154(b) by 526 days.

(21) Appl. No.: 13/679,694

(22) Filed: Nov. 16, 2012

(65) Prior Publication Data

US 2013/0124725 A1    May 16, 2013

Related U.S. Application Data

(60) Provisional application No. 61/560,453, filed on Nov. 16, 2011.

(51) Int. Cl.
*G06F 15/16* (2006.01)
*H04L 29/12* (2006.01)

(52) U.S. Cl.
CPC ........ *H04L 61/1511* (2013.01); *H04L 61/2015* (2013.01); *H04L 61/2076* (2013.01)

(58) Field of Classification Search
CPC .................... H04L 41/5048; H04L 41/5054
USPC .................................................. 709/223, 224
See application file for complete search history.

(56) References Cited

U.S. PATENT DOCUMENTS

| | | | |
|---|---|---|---|
| 5,408,619 A | 4/1995 | Oran | |
| 6,751,729 B1 | 6/2004 | Giniger et al. | |
| 6,769,031 B1 | 7/2004 | Bero | |
| 7,313,631 B1 | 12/2007 | Sesmun et al. | |
| 7,440,452 B1 | 10/2008 | Giniger et al. | |
| 7,464,136 B2 | 12/2008 | Lemson et al. | |
| 7,558,862 B1 | 7/2009 | Tyukasz et al. | |
| 7,600,042 B2 | 10/2009 | Lemson et al. | |
| 7,620,707 B1 | 11/2009 | Sutherland et al. | |
| 7,734,799 B1 | 6/2010 | Anka | |

(Continued)

OTHER PUBLICATIONS

LabTech product documentation, Dynamic DNS Setup, page date Mar. 8, 2011, Tampa, Florida.

(Continued)

*Primary Examiner* — Adnan Mirza
(74) *Attorney, Agent, or Firm* — Foley & Lardner LLP; John D. Lanza

(57) ABSTRACT

Systems and methods of the present disclosure facilitate updating the translation provided by one or more name servers from symbolic names to network addresses. In some embodiments, the system includes one or more remote devices, a management server, a configuration module, a detection module, and/or an update module. The management server may be configured to monitor and manage the remote device, which may be provided with network addresses by one or more address provisioning servers. Responsive to the detection module detecting a change in the network address of a remote device, the update module may update one or more name servers using an update program that includes templates for a control file, authentication information, and/or a template obtained from the management server. The detection and update modules can execute on remote devices or on the address provisioning server, and can be installed and configured automatically by the management server.

18 Claims, 13 Drawing Sheets

(56) References Cited

U.S. PATENT DOCUMENTS

| | | | |
|---|---|---|---|
| 7,814,190 B2 | 10/2010 | Kacin et al. | |
| 7,818,427 B2 | 10/2010 | Kacin et al. | |
| 7,827,547 B1 | 11/2010 | Sutherland et al. | |
| 7,890,615 B2 | 2/2011 | Kacin et al. | |
| 7,941,599 B2 | 5/2011 | Kacin et al. | |
| 7,984,143 B2 | 7/2011 | Sullivan | |
| 8,042,169 B2 | 10/2011 | Logigan et al. | |
| 8,055,751 B2 | 11/2011 | Riordan et al. | |
| 8,086,740 B2 | 12/2011 | Tyukasz et al. | |
| 8,103,751 B2 | 1/2012 | Kacin et al. | |
| 8,140,748 B2 | 3/2012 | Kacin et al. | |
| 8,161,162 B1 | 4/2012 | Sutherland et al. | |
| 8,195,797 B2 | 6/2012 | Sullivan | |
| 8,200,794 B1 | 6/2012 | Sutherland et al. | |
| 8,214,476 B2 | 7/2012 | Sullivan | |
| 8,250,238 B2 | 8/2012 | Takahashi | |
| 8,271,637 B2 | 9/2012 | Sutherland et al. | |
| 2006/0092861 A1* | 5/2006 | Corday et al. | 370/256 |
| 2008/0120210 A1 | 5/2008 | Leventhal | |
| 2008/0201487 A1 | 8/2008 | Blinn et al. | |
| 2008/0307318 A1 | 12/2008 | Sullivan | |
| 2008/0310323 A1 | 12/2008 | Shirota et al. | |
| 2008/0313231 A1 | 12/2008 | Kloba | |
| 2009/0132709 A1* | 5/2009 | Pelley | 709/226 |
| 2009/0177786 A1 | 7/2009 | Takahashi | |
| 2010/0064299 A1 | 3/2010 | Kacin et al. | |
| 2010/0100778 A1 | 4/2010 | Sullivan | |
| 2010/0128639 A1 | 5/2010 | Dehaan et al. | |
| 2010/0142410 A1* | 6/2010 | Huynh Van et al. | 370/255 |
| 2010/0223368 A1 | 9/2010 | Runcie et al. | |
| 2010/0241736 A1 | 9/2010 | Anka | |
| 2011/0078676 A1 | 3/2011 | Sutherland et al. | |
| 2011/0145056 A1 | 6/2011 | Sullivan et al. | |
| 2011/0208857 A1* | 8/2011 | Gentile et al. | 709/224 |
| 2012/0064875 A1 | 3/2012 | Miller | |
| 2012/0064880 A1 | 3/2012 | Miller | |
| 2012/0096172 A1 | 4/2012 | Tyukasz et al. | |
| 2012/0124185 A1 | 5/2012 | Kacin et al. | |
| 2012/0191802 A1 | 7/2012 | Rodrigues | |
| 2012/0191828 A1 | 7/2012 | Rodrigues | |
| 2012/0191829 A1 | 7/2012 | Rodrigues | |
| 2012/0198044 A1 | 8/2012 | Sutherland et al. | |
| 2012/0246479 A1 | 9/2012 | Sutherland et al. | |

OTHER PUBLICATIONS

LabTech Wiki documentation, Dynamic DNS Setup, captured Jan. 22, 2010, Toledo, Ohio.

LabTech, LabTech Software Announces Release of LabTech 2010.2, Nov. 18, 2010, Tampa, Florida.

* cited by examiner

AUTOMATED MANAGEMENT OF GENERALIZED CENTRAL NAME SERVICES BY DISTRIBUTED REMOTE DEVICES

CROSS-REFERENCE TO RELATED PATENT APPLICATIONS

The present application claims priority to and the benefit of U.S. Provisional Patent Application No. 61/560,453, filed Nov. 16, 2011 entitled "Automated Management of Generalized Central Name Services by Distributed Agents," the contents of which is incorporated by reference in its entirety.

TECHNICAL FIELD

The present disclosure generally relates to the use of dynamic DNS (DDNS) to provide mnemonic names to devices with dynamically assigned network addresses. More specifically, in some embodiments, the present disclosure relates to updating the name servers implementing that DDNS. The automation is achieved in a way that is independent of the specific implementation of DDNS, by using a general management system that provides the update using templates that can be adapted to any implementation.

BACKGROUND

Computer networks may use a fixed numeric identifier for each machine in the network as the network address. For example, Internet Protocol version 4 (IPv4) uses a 32-bit number that is written as four 8-bit decimal numbers separated by periods, such as 192.168.10.1 as an example. Symbolic names for a network may be provided to facilitate identifying various computer networks.

SUMMARY OF THE INVENTION

Systems and methods of the present disclosure improve the setup, configuration, and/or maintenance of one or more components of a network that uses dynamic name services. In some embodiments, a system provides a convenient way to update dynamic name servers, independent of the particular implementation of the dynamic name server protocol or the underlying name servers. Some embodiments may operate in conjunction with a Remote Monitoring and Management (RMM) system that is used to monitor and manage the devices that are served by the name servers.

In some aspects, the present disclosure is directed to a system for updating the translation provided by one or more name servers from symbolic names to network addresses. In some embodiments, the system includes one or more remote devices. The remote devices may be provided with network addresses by one or more address provisioning servers. In some embodiments, the system includes a management server. The management server may be configured to monitor and manage the remote devices. In some embodiments, the system includes a configuration module. An administrative user may control the management server responsive to the configuration module. In some embodiments, the system includes a detection module. The detection module may detect a change in the network address of one or more of the remote devices. In some embodiments, the system includes an update module. The update module may be triggered by the detection module, and may update one or more of the name servers, using an update program retrieved from the management server, along with authentication information retrieved from the management server. The address provisioning servers may provide DHCP services. The name servers may provide DNS services. The detection and update modules may execute on either the remote devices or on the address provisioning server, and may be installed and configured automatically by the management server. The update module may use templates received from the management server to provide a control file to implement the update.

In some aspects, the present disclosure is directed to a method for updating the translation provided by one or more name servers from symbolic names to network addresses. In some embodiments, the method includes providing network addresses to one or more remote devices. The network addresses may be provided by one or more address provisioning servers. In some embodiments, the method includes monitoring and managing the remote devices. The monitoring and managing may be done by a management server. In some embodiments, the method includes controlling the management server. The management server may be controlled by an administrative user. In some embodiments, the method includes detecting a change in the network address of one or more of the remote devices. In some embodiments, the method includes retrieving one or more update programs, along with authentication information, from the management server and using this to update one or more of the name servers. In some embodiments, the method includes triggering the update.

In some aspects, the present disclosure is directed to a system for updating the translation from symbolic names to network addresses independent of the type of name server. In some embodiments, the system includes a management server. The management server may be configured to monitor and manage one or more remote devices. The remote devices may each be associated with a network address, which may have been provided by one or more address provisioning servers. In some embodiments, the management server is configured to identify a change in the network address of at least one of the remote devices. The management server may further be configured to select a template for an update program. The template may be based on the type of name server (e.g., BIND or WINS). In some embodiments, the management server may be configured to transmit the update program and authentication information to the remote device. The update program and authentication information may be configured to update a name servers with the change based on the template.

In some embodiments, the management server is configured to obtain information corresponding to the identified change in the network address. In some embodiments, the management server is configured to create, based on the information and the template, a configuration file used to update the name server. In some embodiments, the management server is configured to automatically install and configure software configured to detect the change in the network address and update the name server based on the template. The management server may automatically install and configure the software on a remote device.

DETAILED DESCRIPTION

Systems and methods of the present disclosure facilitate updating the translation provided by one or more name servers from symbolic names to network addresses independent of the particular implementation of the dynamic name servers or the underlying name servers. Systems and methods of the present disclosure may work in conjunction with an RMM that is used to monitor and manage the machines in the private network.

A symbolic name system for networks may include the Domain Name System (DNS), which is a hierarchical system where the levels in the hierarchy are written bottom-to-top separated by periods, such as www.labtechsoftware.com as an example. A name server includes software that translates symbolic names (used by humans) to numeric network addresses (used by machines). For example, a DNS server runs in a hierarchical network that mimics the structure of DNS. There are a plurality of name server software packages including, e.g., Berkeley Internet Name Domain (BIND) and Windows Internet Name Service (WINS).

In some embodiments, systems and method of the present disclosure automate the setup, configuration, and maintenance of the components of a network that uses dynamic services. For example, a management server may be configured to monitor and manage a remote device. The management server may determine the type of name server associated with the remote device and select a corresponding template. The management server may determine a change to the network address of the remote device via the remote device and provide the remote device with an update program based on the template. The update program may be used to generate a configuration file which may be used to update the name server associated with the remote device.

Figure 1:
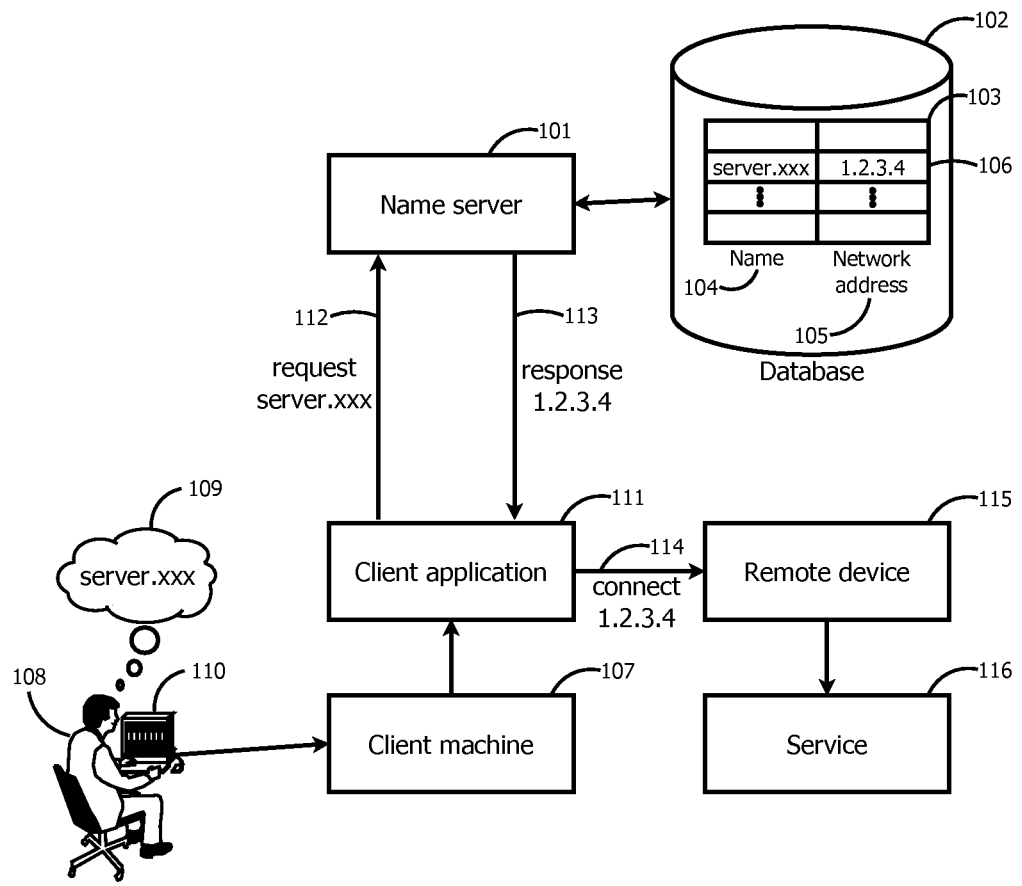
FIG. 1 is an illustrative block diagram of an embodiment of a name server.

FIG. 1 illustrates an embodiment of a name server. In some embodiments, the name server 101 may include multiple, logically-grouped servers and may be referred to as a server farm. In some embodiments, the server 101 may include servers that are geographically dispersed. The server farm may be managed by a single entity. In some embodiments, the servers within each machine farm can be heterogeneous—one or more servers of server 101 can operate according to one type of operating system platform (e.g., WINDOWS NT, manufactured by Microsoft Corp. of Redmond, Wash.), while one or more of the other servers can operate on according to another type of operating system platform (e.g., Unix, Linux, or Mac OS X manufactured by Apple Computer Corp. of Cupertino, Calif.). The server 101 may include a name server, file server, application server, web server, proxy server, appliance, network appliance, gateway, gateway server, virtualization server, deployment server, SSL VPN server, or firewall.

The name server may communicate with remote devices 115 via a network (e.g., 112, 113 and 114). The network may include wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The communication channel 105 standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network may be any type and/or form of network. The geographical scope of the communication channel 105 may vary widely and the communication channel 105 can be a body area network (BAN), a personal area network (PAN), a local-area network (LAN), e.g. Intranet, a metropolitan area network (MAN), a wide area network (WAN), or the Internet. The topology of the communication channel 105 may be of any form and may include, e.g., any of the following: point-to-point, bus, star, ring, mesh, or tree. The network may be an overlay network which is virtual and sits on top of one or more layers of other networks. The network may include any such network topology as known to those ordinarily skilled in the art capable of supporting the operations described herein. The network may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The communication channel 105 may be a type of a broadcast network, a telecommunications network, a data communication network, or a computer network.

The remote device (e.g., 115) may include, e.g., a computing device, desktop computer, portable computer, laptop, notebook computer, smartphone, personal digital assistant ("PDA"), tablet computer, electronic book reader, point of sale system, mainframe computer, rack mount server, workstation, turnkey system, thin client machine, virtual machine, embedded system, process controller, dedicated server, shared server, file server, application server, web server, proxy server, appliance, network appliance, gateway, gateway server, virtualization server, deployment server, SSL VPN server, firewall, etc. In some embodiments, a remote device may operate according to any type of operating system platform (e.g., WINDOWS NT, manufactured by Microsoft Corp. of Redmond, Wash., Unix, Linux, Mac OS or iOS, both manufactured by Apple Computer Corp. of Cupertino, Calif., Chrome OS or Android, both manufactured by Google Corp. of Mountain View, Calif.). In some embodiments, a remote device may operate with or without external storage. In some embodiments, a remote device may operate with or without a display. In some embodiments, a remote device 108a-108n may operate with or without user input devices. In some embodiments, a remote device may operate with constant network connectivity or with intermittent network connectivity. In some embodiments, a remote device may be a server class machine.

In some embodiments, the name server 101 includes a database 102 with a table 103 that comprises a translation from the name 104 to the corresponding network address 105 for every machine served by the name server. A single row 106 in the table 103 includes the translation from one name to one network address, for example, translating server.xxx to 1.2.3.4 as shown.

When a user 108 wants to use a service 116 on the network, the user 108 may refer to the service using its symbolic name 109, for example server.xxx, and use an interface 110 on a client machine 107 to access the service 116. The client machine 107 uses a client application 111 to access the service 116 and presents it with the symbolic name. The client application 111 then sends a request 112 containing the symbolic name to the name server 101. The name server 101 looks in the table 103 to find the appropriate row 106 and sends back the network address in a response 113 to the client application 111. The client application 111 then uses the network address to connect 114 to the remote device 115 which supplies the service 116 to the end user 108.

Many networks are set up such that an individual machine does not always have the same numeric network address. For example the numeric address may be automatically assigned. This greatly reduces the effort required to configure and manage the network. For example, the numeric addresses may be assigned from a local server using Dynamic Host Configuration Protocol (DHCP).

Figure 2:
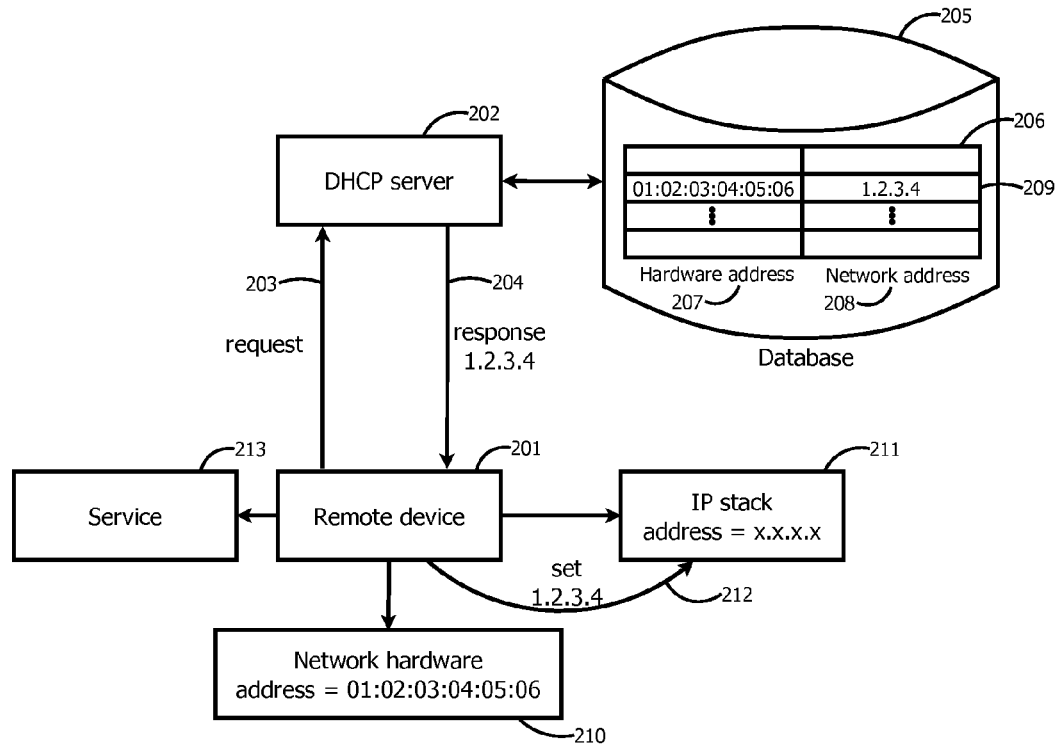
FIG. 2 is an illustrative block diagram of an embodiment of an address provisioning server.

FIG. 2 illustrates how a machine analogous to the remote device 115 of FIG. 1 can get a network address that changes from time to time. The remote device 201 includes network hardware 210 with a fixed hardware address, for example 01:02:03:04:05:06 as a Media Access Control (MAC) address, but it needs a network address for the Internet Protocol (IP) software stack 211 to operate. During startup, the remote device 115 may send a request 203 to the DHCP server 202 on the network (usually using a broadcast protocol, since it has a limited network software stack at that point). The DHCP server assigns an unused network address, for example 1.2.3.4, to the machine. It records that address in its database 205, specifically in a table 206 with columns for hardware address 207 and network address 208, either adding or replacing a row 209 in the table 206 with the correct values for the network address it just allocated. It then responds 204 to the remote device 201 with the network address, and the server machine uses that network address to initialize 212 the IP stack 211. The server machine is now ready to provide the service 213 using the allocated network address.

To associate a single symbolic name with a physical machine in an environment with dynamic network addresses, the local name server may track the assignment of numeric addresses to machines and provide the correct translation from symbolic name to numeric address. This is known as a dynamic name service and may be implemented in many different ways. For example, the name server may be the same piece of software that delivers the addresses through DHCP, or it may be integrated through Dynamic DNS (DDNS).

Without a dynamic name service, when a network address is assigned as shown in FIG. 2, the database 103 in FIG. 1 may not be updated with the information about the network address for the remote device 115 or 201, so it may not be able to correctly respond to requests 112 with the symbolic name for the remote device 115 or 201.

Figure 3:
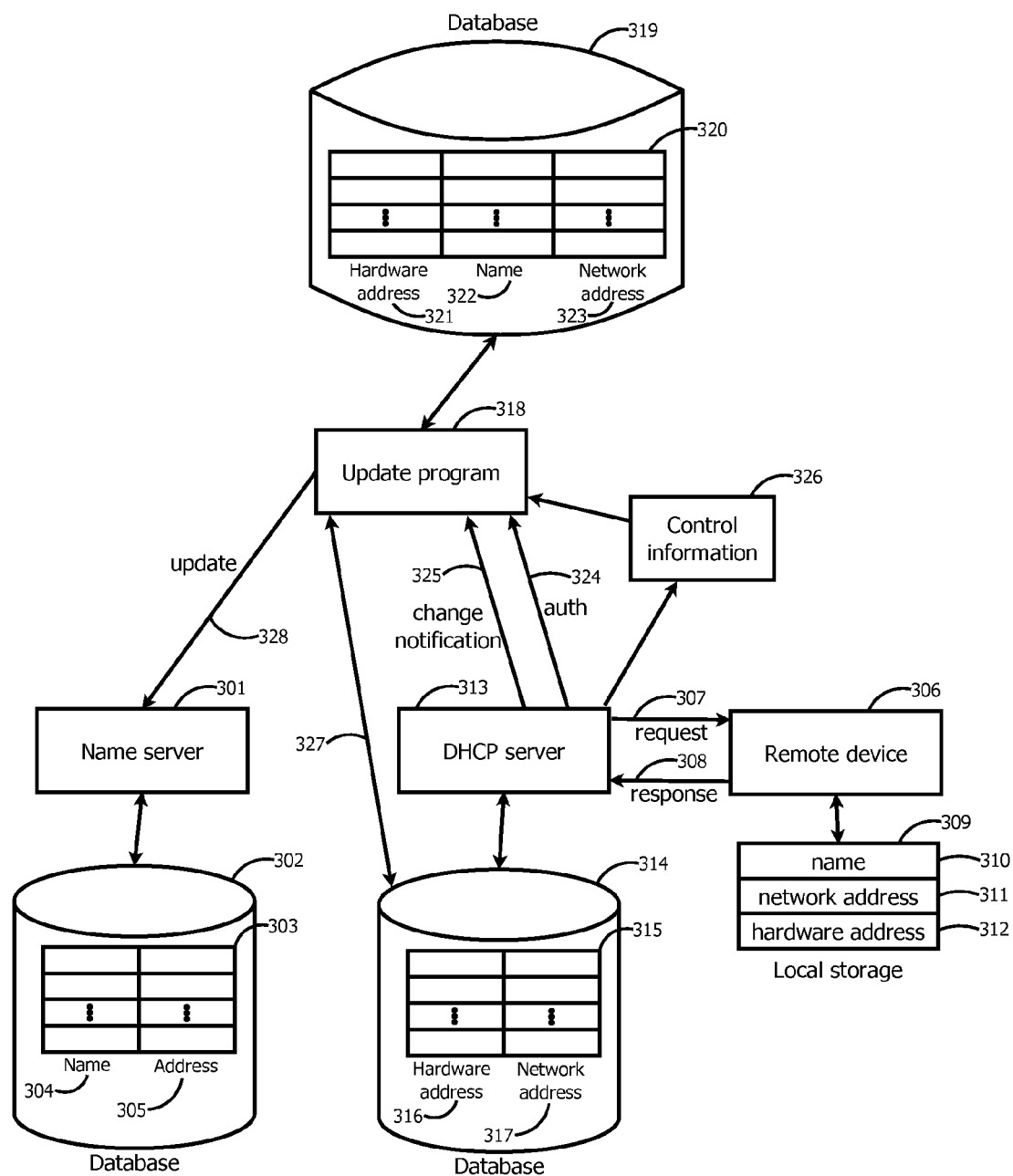
FIG. 3 is an illustrative block diagram of an embodiment of a dynamic name service.

FIG. 3 shows how this issue is resolved using a dynamic name service. The name server 301 may include a similar setup with a database 302 that includes a table 303 with columns for name 304 and network address 305. This may be analogous to the name server 101, database 102, table 103, and columns for name 104 and network address 105 of FIG. 1. The DHCP server 313 may be set up the same way with a database 314 containing a table 315 with columns for hardware address 316 and network address 317. This may be analogous to the DHCP server 202, database 205, table 209, and columns for hardware address 207 and network address 208 of FIG. 2. Similar to FIG. 2, when the remote device 306 is initializing, the remote device may send a request 307 to the DHCP server 313 and receives a response 308 with a network address. The remote device 306 keeps some local storage 309 up to date with its name 310, network address 311, and hardware address 312. The DHCP server 313 uses an update program 318 to keep the name server 301 current with network addresses it has allocated. The update program 318 may include its own database 319, with a table 320 that comprises columns for hardware address 321, name 322, and network address 323. When the DHCP server 313 delivers a response 308 with a network address, it may also create control information 326 containing the hardware address and network address in a format that the update program 318 can use. The DHCP server may then send a change notification 325 to the update program 318. The update program 318 reads the control information 326, uses the hardware address to locate the correct row in its table 320, or adds a new row if necessary, and updates the row with the network address 323. The DHCP server may also send authentication information 324 to the update program 318 to allow the update program to update the name server 301. The update program 318 may use this authentication information to send an update 328 to the name server 301 with the name and new network address that was just set up. The name server 301 may use the authentication information 324 to verify that the update 328 is a legitimate one, and then use the name and network address in the update 328 to update the address column 305 in its table 303. The name server 301 is may then be properly configured to answer requests about this name. In some embodiments, the update program 318 may directly access 327 the same table 315 as the DHCP server, so it may not need control information 326. In some embodiments, the DHCP server may use database 314, in which case it may not have its own database 319 and table 320, and the name column 322 is instead added to the table 315 in the database 314 of the DHCP server 313.

Figure 4:
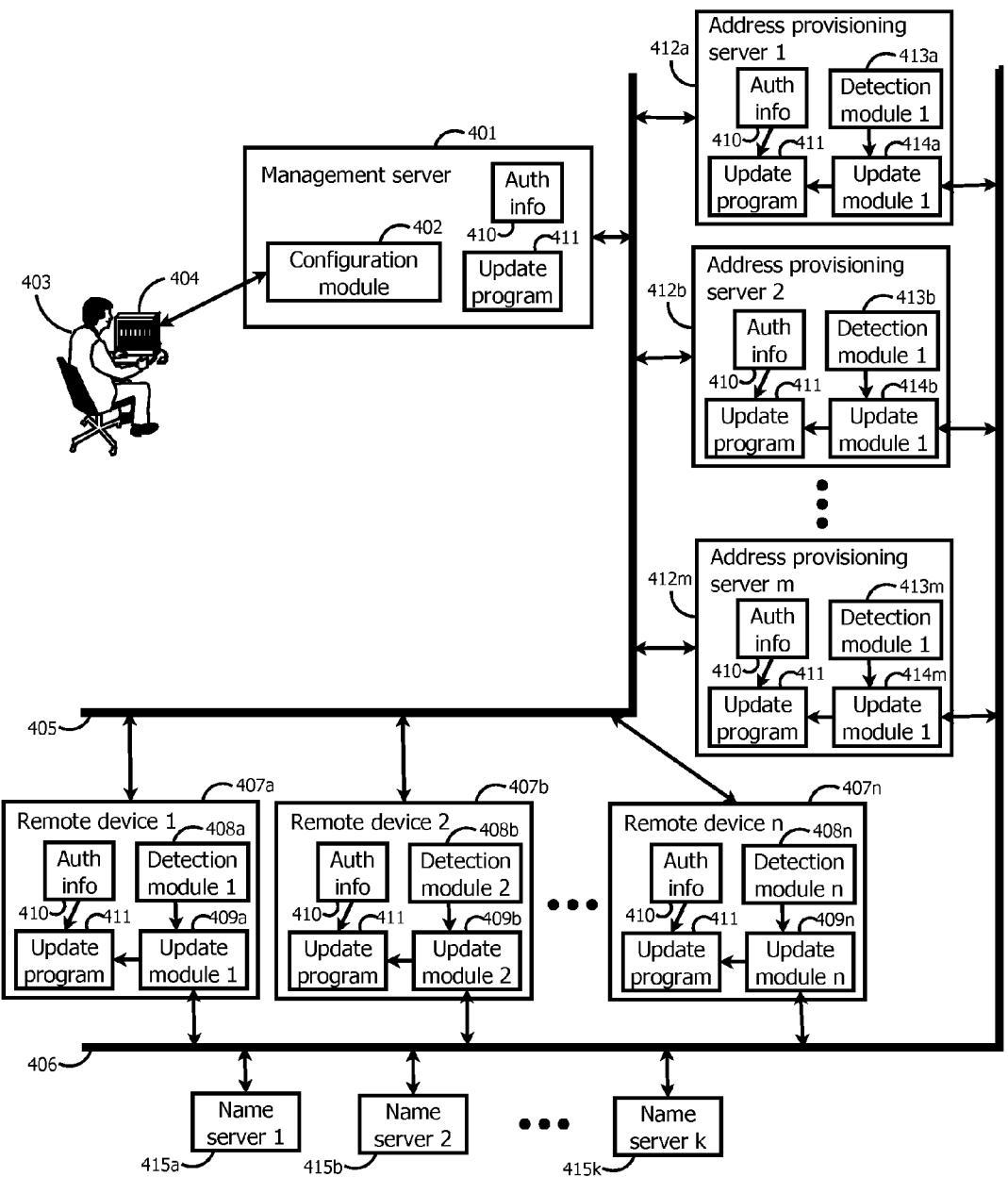
FIG. 4 is an illustrative block diagram of one embodiment of a system for updating the translation provided by one or more name servers from symbolic names to network addresses.

Referring now to FIG. 4, an illustrative block diagram of one embodiment of a system for updating the translation provided by one or more name servers 415a-415k from symbolic names to network addresses is shown. In brief overview, in some embodiments, the system includes a management server configured to manage and/or monitor remote devices. The management server may include a configuration module 402, an update program 411 and/or authentication information 410. The configuration module 402 may be configured to create a configuration file for the update program based on one or more configuration parameters for the remote device. In some embodiments, the update program 411 is configured to update a name server by, e.g., using a configuration file and transferring the file to the name sever and/or via an Application Programming Interface (API). In some embodiments, the system may include one or more address provisioning servers 412a-m configured to assign a network address to a remote device 407. The address provisioning servers 412a-m may include a detection module 413 and/or an update module 414. In some embodiments, the update module 414 obtains the update program 411 from the management server 401 in order to update, e.g., one or more of a database of the address provisioning server, a name server 415, and a remote device.

The management server, address provisioning server, naming server and remote devices may include various hardware and/or software components including, e.g., an application, program, library, script, service, process, task or any other type and form of executable instructions capable of providing the functionality disclosed herein.

In some embodiments, the system includes one or more remote devices 407a-407n connected to one or more address provisioning servers 412a-412m through network 405. Remote devices may include, e.g., mobile computing devices (e.g., laptops, tablets, smartphones, PDAs), desktop computers, game consoles, etc. The remote devices 407a-407n can have network addresses assigned by one or more of the address provisioning servers 412a-412m. The remote devices 407a-407n may be connected to one or more name servers 415a-415k through network 406. In some embodiments, network 405 and network 406 may be the same network. The remote devices 407a-407n may use one or more of name servers 415a-415k for name services, to translate symbolic names to network addresses.

In some embodiments, the system of FIG. 4 may include a remote monitoring and management (RMM) and/or access to a RMM. For example, an administrative user 403 may use a RMM system to monitor and manage one or more of remote devices 407a-407m. The administrative user 403 may also use the RMM system to monitor and manage one or more of the address provisioning servers 412a-412m. The system may include an interface 404 configured to allow an administrative user 403 to monitor and/or manage remote devices 407a-407m. For example, an administrative user 403 may interacting through an interface 404 with a configuration module 402 on a management server 401. The management server may monitor and/or manage by connecting through network 405 to remote devices 407a-407n and address provisioning servers 412a-412m.

In some embodiments, the management server 401 maintains the authentication information 410 for accessing the name servers 415a-415k, and may also maintain an update program 411 that implements the management features of the name servers 415a-415k. The management server, as part of the RMM functionality, can install and configure the update program 411 on the remote devices 407a-407n. The management server 401 may also store the authentication information 410 on the remote devices 407a-407n.

Similarly, in some embodiments, the management server 401, as part of the RMM functionality, can install and configure the update program 411 on the address provisioning servers 412a-412m. The management server 401 may also store the authentication information 410 on the address provisioning servers 412a-412m.

In some embodiments, the RMM systems includes a detection module 408a-408n configured to detect a change in the network address of one or more of the remote devices 407a-407n. The detection module 408a-408n can trigger an update module 409a-409n, which can then use the update program 411 to update one or more of the name servers 415a-415k through network 406 with the new network address of the remote device 407a-407n. The update program 411 can use the authentication information 410 to authenticate this update of the name servers 415a-415k.

In some embodiments, the detection module 413a-413m may be configured to detect a change in the network address of one or more of the remote devices 407a-407n when one or more of the address provisioning servers 412a-412m provides a new network address to a remote device 407a-407n. In this case, the detection module 413a-413m can trigger an update module 414a-414m, which can then use the update program 411 to update one or more of the name servers 415a-415k through network 406 with the new network address of the remote device 407a-407n. The update program 411 can use the authentication information 410 to authenticate this update of the name servers 415a-415k.

Figure 5:
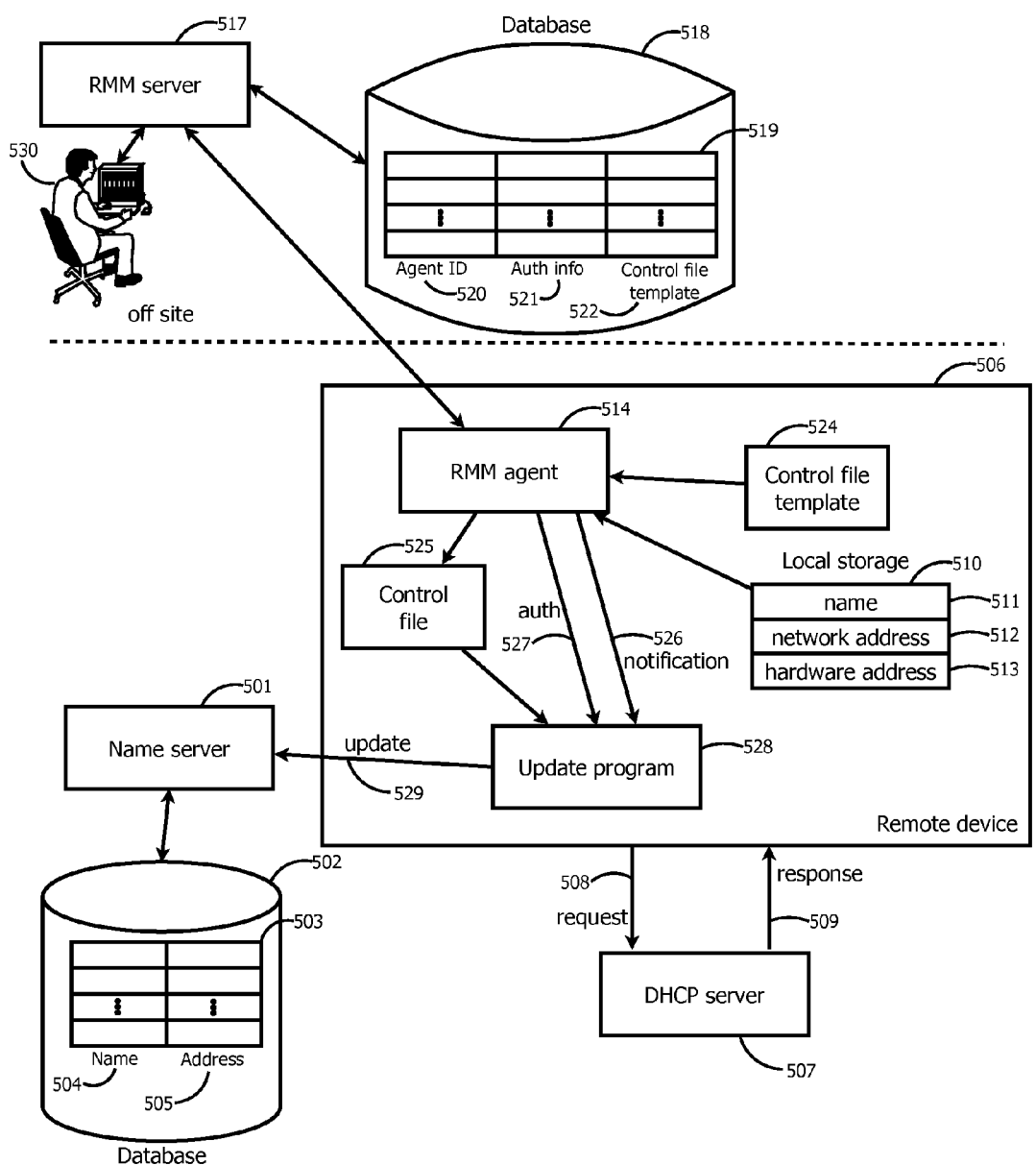
FIG. 5 is an illustrative block diagram of one embodiment of an RMM system that automates updates to the translation provided by one or more name servers from symbolic names to network addresses, using an RMM agent on one of at least one devices served by a name server.

Referring now to FIG. 5, an illustrative block diagram of one embodiment of an RMM system that automates updates to the translation provided by one or more name servers from symbolic names to network addresses, using an RMM agent on one of at least one devices served by a name server, is shown. In some embodiments, the RMM server 517 is configured to facilitate managing the machines at the site. For example, the administrative user 530 may use an RMM server 517 (which can be offsite, but is not required to be so) to manage the machines at the site. The RMM server 517 may include or have access to a database 518 with a table 519 that comprises columns with the agent ID 520, authentication information 521, and/or a control file template 522. In some embodiments, the RMM server 517 may manage remote devices via an RMM agent 514 that runs on each machine at the site.

In some embodiments, the RMM agent 514 runs on the remote device 506. The RMM agent 514 installs and configures the update program 528 on the remote device 506 using information from the RMM server 517. For example, the process may be automated. The name server 501, its database 502, and table 503 with columns for name 504 and network address 505 are analogous to the name server 101, database 102, table 103, and columns for name 104 and network address 105 of FIG. 1. When the remote device 506 starts, the remote device may send a request 508 to the DHCP server 507, which responds 509 with a network address. In some embodiments, the remote device 506 updates its local storage 510 with the network address 512, as well as keeping the name 511 and hardware address 513 updated. In some embodiments, the RMM agent 514 obtains a notification from the operating system that this update has happened. In some embodiments, the RMM agent 514 polls the local network address periodically and discovers that it has changed. As a result, the RMM agent may fetch one or more of the name 511, network address 512, and hardware address 513 from the local storage 510 and uss a control file template 524 to prepare a control file 525 with this information. The control file template 524 may come from the RMM server 517 and is flexible enough to allow configuration changes and use with any kind of update program 528 that may be required. The RMM agent 514 may then send a notification 526 and authentication information 527 to the update program 528, which may read the control file 525 and use this to send an update request 529 to the name server 501, in a fashion analogous to the update request 328 sent by the update program 318 of FIG. 3. The name server 501 uses this information to update the address column 505 in its table 503, and now the name server 501 is properly configured to answer requests about this name.

In this way, the name server 501 at the site may be kept up-to-date with the network addresses of the machines at the site, and any configuration of the update program 528 and its control file 525 can be done by an administrative user using the RMM server 517. For example, this may provide the power and flexibility of dynamic name services while relieving administration from the users at the site.

Figure 6:
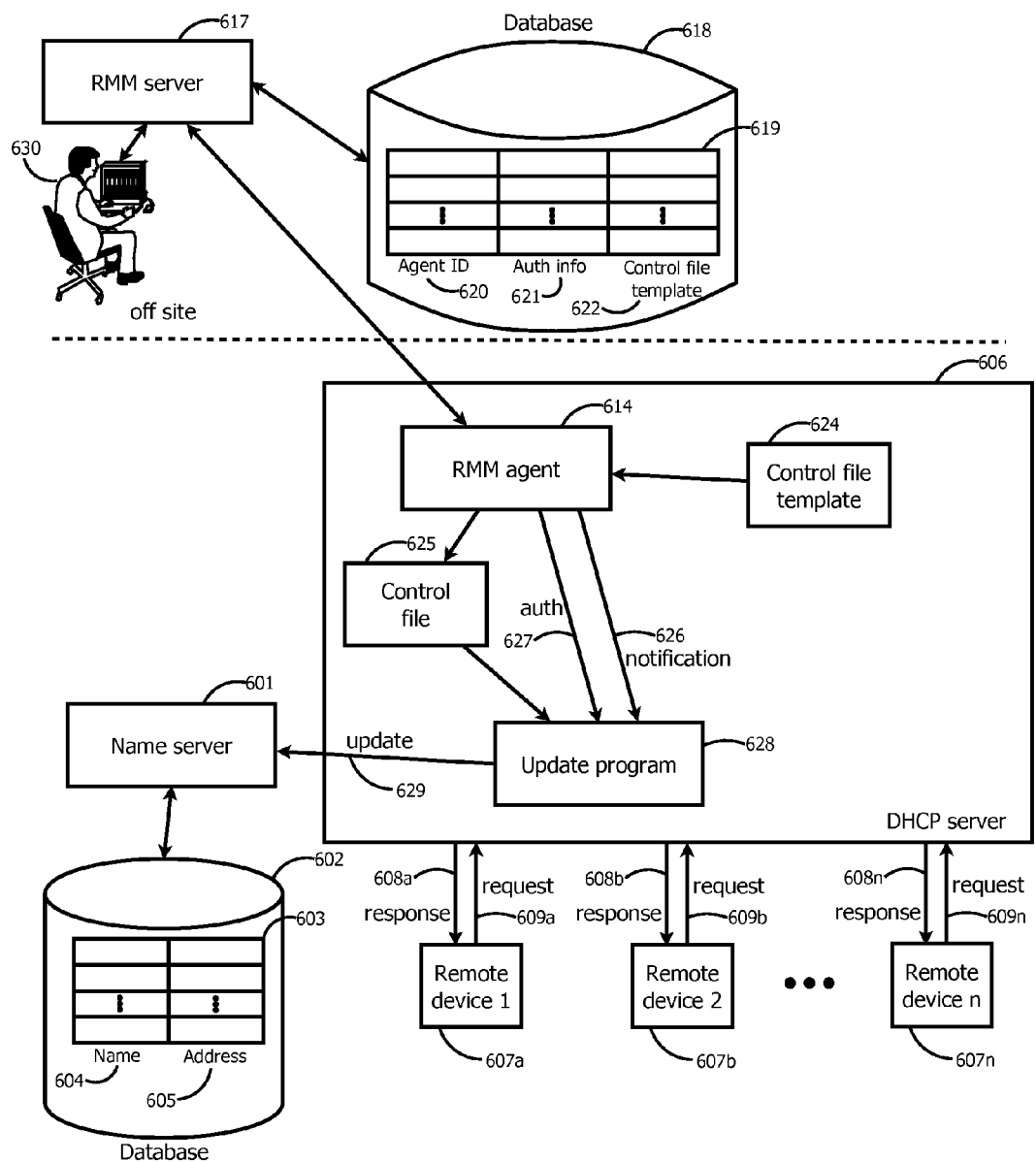
FIG. 6 is an illustrative block diagram of one embodiment of an RMM system that automates updates to the translation provided by one or more name servers from symbolic names to network addresses, using an RMM agent on an address provisioning server configured to provide network addresses to at least one device in the network.

Referring now to FIG. 6, an illustrative block diagram of one embodiment of an RMM system that automates updates to the translation provided by one or more name servers from symbolic names to network addresses, using an RMM agent on an address provisioning server configured to provide network addresses to at least one device in the network, is shown. In some embodiments, the administrative user 630 uses an RMM server 617 (which can be offsite, or onsite) to manage the machines at the site. The RMM server 617 may include a database 618 with a table 619 that comprises columns with the agent ID 620, authentication information 621, and a control file template 622. Management by the RMM server 617 may be done through the use of an RMM agent 614 that runs on each machine at the site. In this description, we describe the process involving the RMM agent 614 that is running on the DHCP server 606. The RMM agent 614 installs and configures the update program 628 on the DHCP server 606 using information from the RMM server 617, so this process is automated. The name server 601, its database 602, and table 603 with columns for name 604 and network address 605 are analogous to the name server 101, database 102, table 103, and columns for name 104 and network address 105 of FIG. 1. When any of the remote devices 607a-607n start, they may send a request 608a-608n to the DHCP server 606, which responds 609a-609n with a network address. The remote device 607a-607n uses this network address for further communication. When the DHCP server 606 completes this operation, in some embodiments, the RMM agent 614 obtains a notification from the operating system that this operation has completed. In some embodiments, the RMM agent 614 polls the local DHCP database periodically and discovers that an update occured. As a result, the RMM agent 614 may retrieve one or more of the name, network address, and hardware address of the remote device that was updated, and may use a control file template 624 to prepare a control file 625 with this information. The control file template 624 may come from the RMM server 617 and may be flexible enough to allow configuration changes and use with any kind of update program 628 that may be required. In some embodiments, the RMM agent 614 sends a notification 626 and authentication information 627 to the update program 628. The update program 628 may read the control file 625 and use the control file 625 to send an update request 629 to the name server 601. The name server 601 may use this information to update the address column 605 in its table 603, and now the name server 601 may be properly configured to answer requests about this name.

In some embodiments, the name server 601 at the site may be kept up to date with the network addresses of the machines at the site, and any configuration of the update program 628 and its control file 625 can be done by an administrative user via the RMM server 617.

Figure 7:
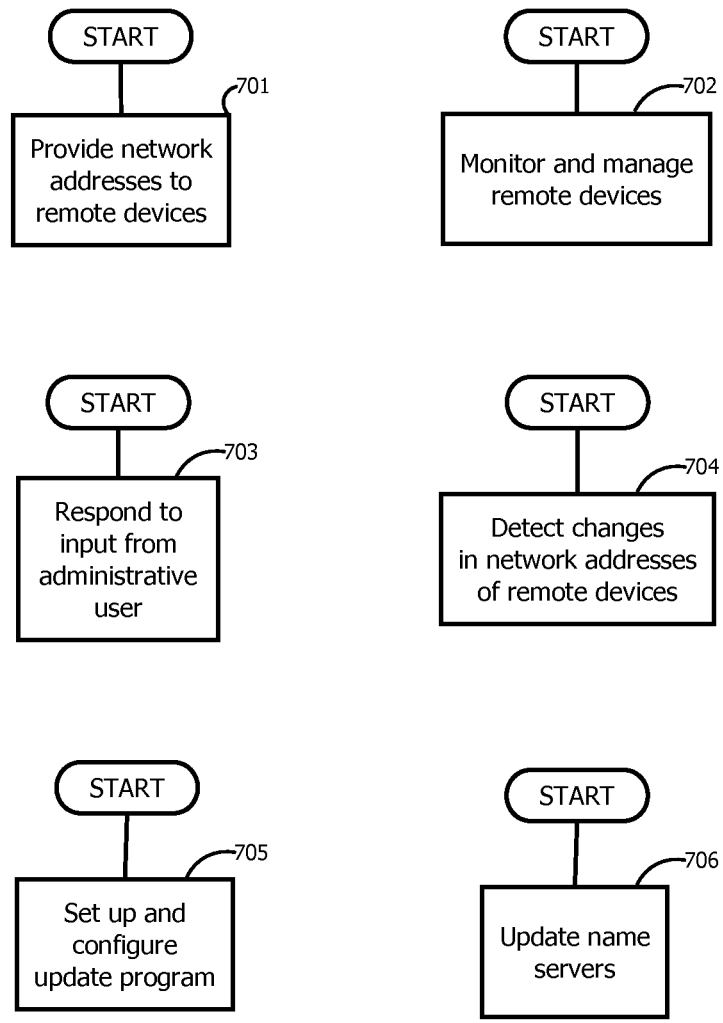
FIG. 7 is an illustrative flowchart depicting one embodiment of a method for updating the translation provided by one or more name servers from symbolic names to network addresses.

Referring now to FIG. 7, an illustrative flowchart depicting one embodiment of a method for updating the translation provided by one or more name servers from symbolic names to network addresses is shown. In some embodiments, the method includes providing network addresses to remote devices (step 701). This is described more fully in FIG. 8. In some embodiments, the method includes monitoring and managing remote devices (step 702). This is described more fully in FIG. 9. In some embodiments, the method includes responding to input from an administrative user (step 703). This is described more fully in FIG. 10. In some embodiments, the method includes detecting changes in network addresses of remote devices (step 704). This is described more fully in FIG. 11. In some embodiments, the method includes setting up and configuring the update program (step 705). This is described more fully in FIG. 12. In some embodiments, the method includes updating name servers (step 706). This is described more fully in FIG. 13.

Figure 8:
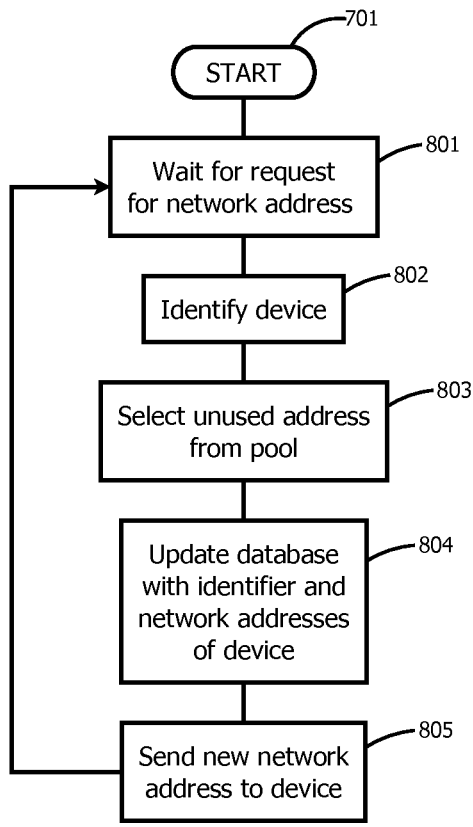
FIG. 8 is an illustrative flowchart depicting one embodiment of the steps taken to provision network addresses.

Referring now to FIG. 8, an illustrative flowchart depicting one embodiment of the steps taken to provision network addresses is shown. In some embodiments, at step 801, the method may include waiting for a request for a network address. When such a request is received, at step 802, the method may include identifying the device making the request, for example, using the MAC address in the Ethernet packet carrying the request. At step 803, the method may include selecting an unused network address from the pool of addresses maintained for provisioning. At step 804, the method may include updating the database with the identifier from step 802 and the network address chosen in step 803. At step 805, the method may include sending the network address chosen in step 803 to the device. The method may then include returning to step 801 to await a new request.

Figure 9:
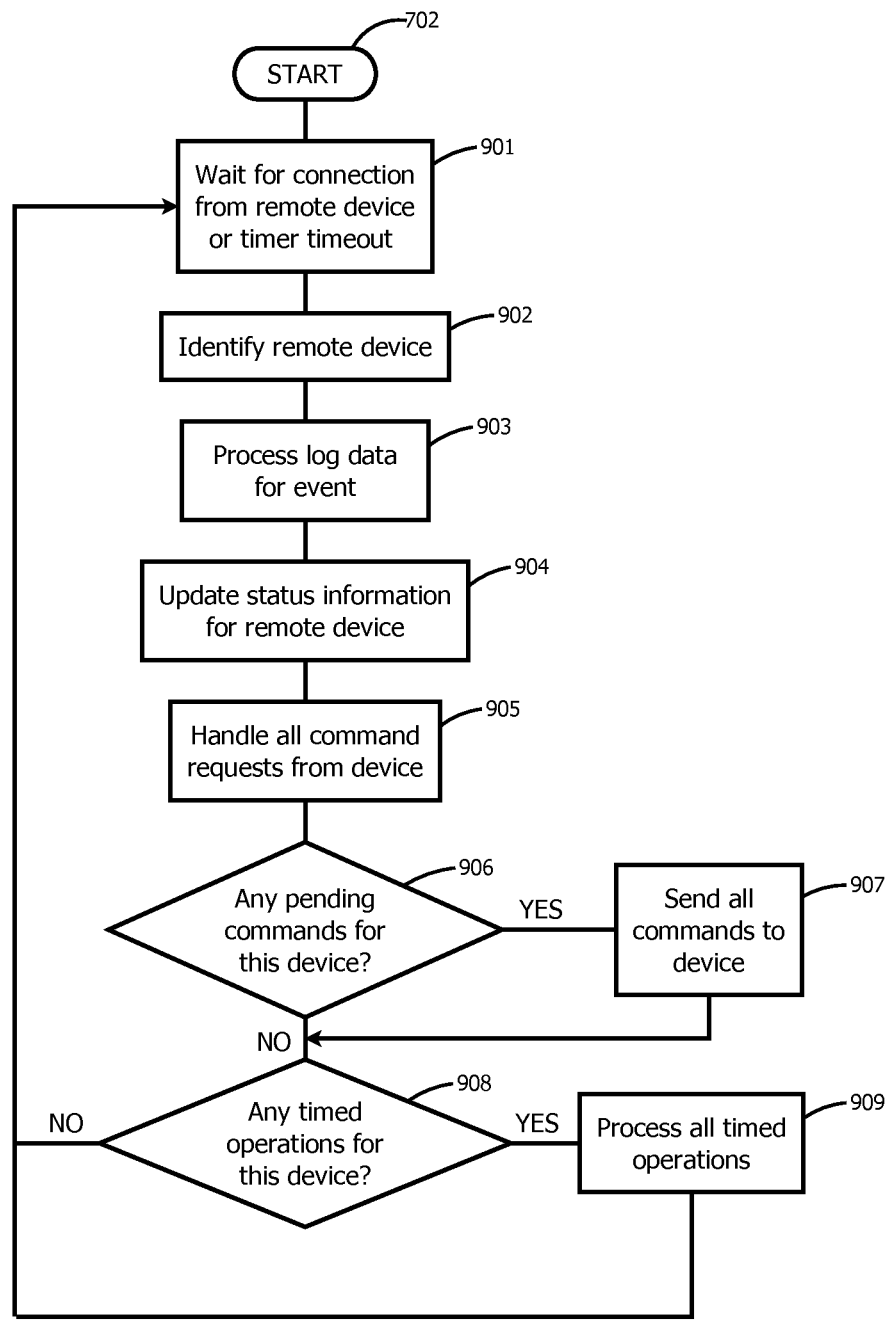
FIG. 9 is an illustrative flowchart depicting one embodiment of the steps taken to monitor and manage remote devices.

Referring now to FIG. 9, an illustrative flowchart depicting one embodiment of the steps taken to monitor and manage remote devices is shown. In some embodiments, at step 901, the method may include waiting for either a connection from a remote device, or a timeout from an internal timer. At step 902, the method may include identifying the device associated with the event that satisfied the wait in step 901. In some embodiments, if step 901 is satisfied with a connection, then step 902 may include identifying the device that initiated the connection. In some embodiments, if step 901 was satisfied with a timeout, then step 902 may include using the device identifier that was associated with the timer. At step 903, the method may include processing logging that is associated with the event that satisfied the wait in step 901. In some embodiments, if step 901 was satisfied with a connection, then step 903 may include logging data that was sent along with the connection. In some embodiments, if step 901 was satisfied with a timeout, then step 903 may include logging information about the timer. At step 904, the method may include updating the database to include any new information about the device identified in step 902, whether it is information received in the connection, or information generated as the result of the timeout. At step 905, the method may include handling any commands from the device that require an action, whether the commands were included in the connection or whether the commands were stored in conjunction with the timer. At step 906, the method may include checking to see if any new commands are pending for the device. In some embodiment, the method may include sending new pending commands to the device (step 907). At step 908, the method may include checking to whether any new timed operations are ready for the device. If new timed operations are ready, the method may include starting the associated timers at step 909. The method may include proceeding to step 901 to await a new event.

Figure 10:
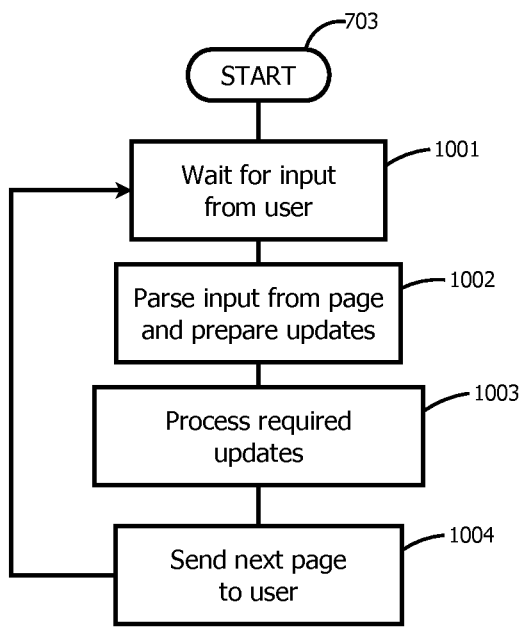
FIG. 10 is an illustrative flowchart depicting one embodiment of the steps taken to respond to input from an administrative user.

Referring now to FIG. 10, an illustrative flowchart depicting one embodiment of the steps taken to respond to input from an administrative user is shown. In some embodiments, at step 1001, the method may include waiting for input from the administrative user. At step 1002, the method may include processing the input from the page and prepares a list of updates driven by that input. At step 1003, the method may include applying the updates prepared in step 1002. At step 1004, the method may include displaying the next page to the administrative user for additional actions. The method may include proceeding to step 1001 to await further input from the administrative user.

Figure 11:
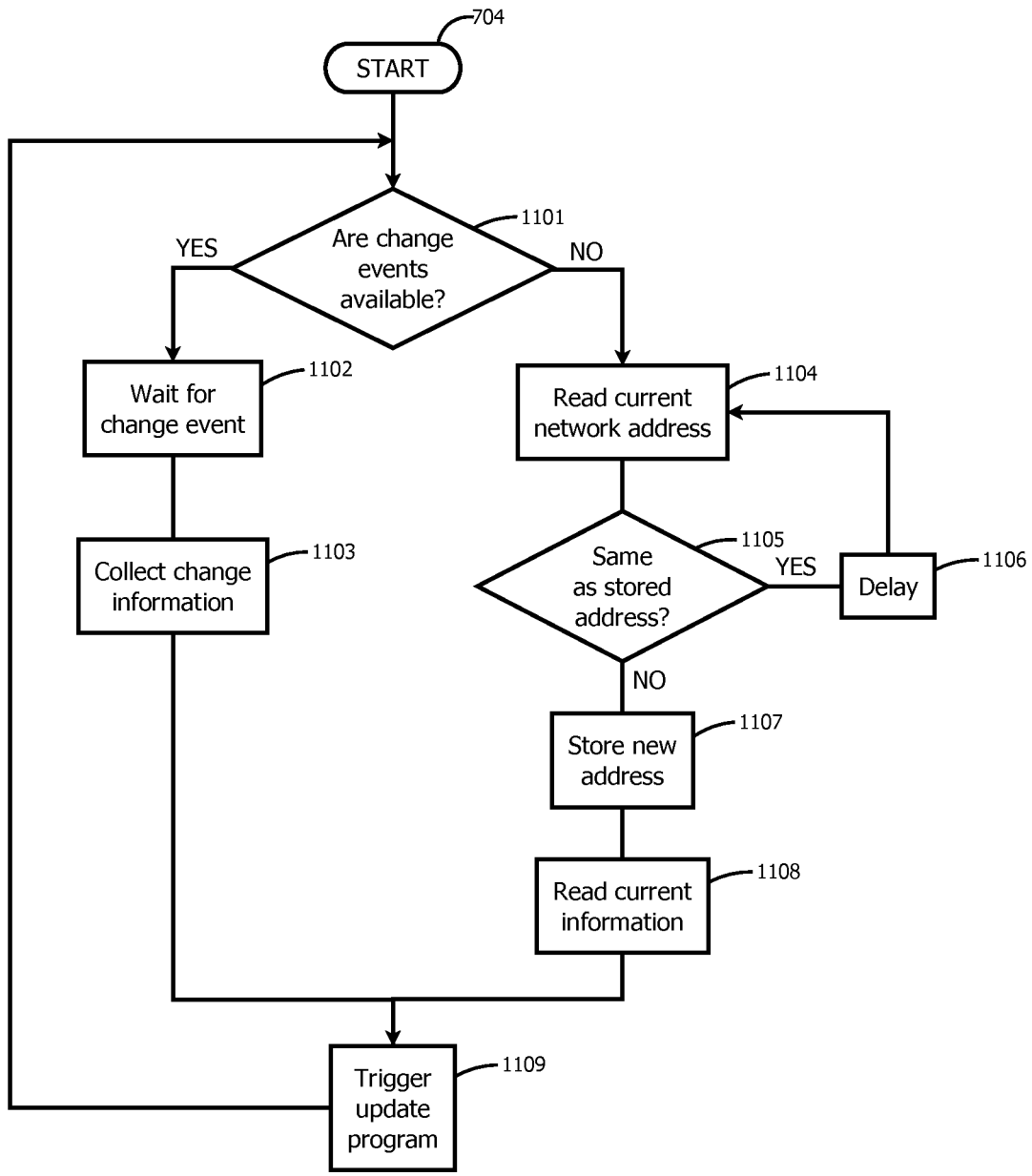
FIG. 11 is an illustrative flowchart depicting one embodiment of the steps taken to detect a change in a network address.

Referring now to FIG. 11, an illustrative flowchart depicting one embodiment of the steps taken to detect a change in a network address is shown. In some embodiments, at step 1101, the method may include checking whether change events for the network address are available in the operating system. If they are, then at step 1102 the method may include waiting for a change event from the operating system. At step 1103, the method may include collecting the relevant information for the update program from the change event. In some embodiments, the method may include proceeding to step 1109 which may include triggering the update program. In some embodiments, the method may include proceeding from step 1109 to step 1101 to repeat the process. If, however, step 1101 discovers that change events are not available, the method may include proceeding to a polling loop. The polling loop may include reading the current network address at step 1104 and comparing the address to a previously stored copy of the network address in step 1105. If the network address has not changed, the method may include proceeding to step 1106 which may include delaying a fixed amount of time. The method may include proceeding to step 1104 which may include continuing the polling. If, however, at step 1105 the method discovers that the network address has changed, at step 1107 the method may include storing the new address for future comparison, and at step 1108 the method may include collecting the relevant information for the update program from the operating system. The method may include proceeding to step 1109 which may include triggering the update program. The method may include proceeding from step 1109 to step 1101 to repeat the process.

Figure 12:
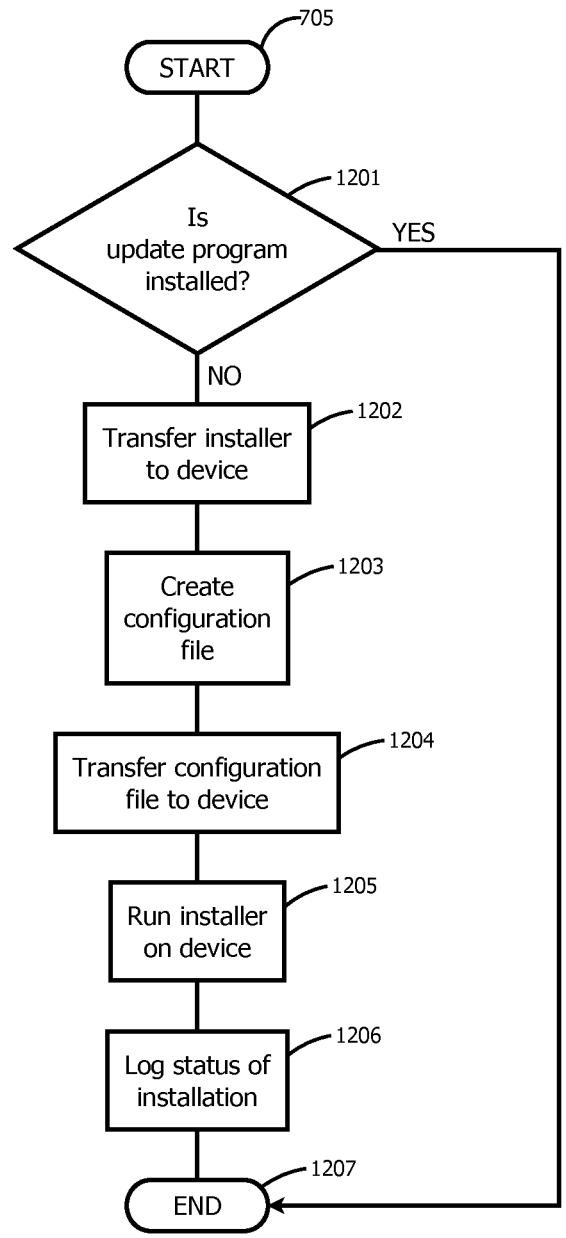
FIG. 12 is an illustrative flowchart depicting one embodiment of the steps taken to set up and configure the update program.

Referring now to FIG. 12, an illustrative flowchart depicting one embodiment of the steps taken to set up and configure the update program is shown. In some embodiments, at step 1201, the method may include checking whether the update program has previously been installed and configured. If the update program has previously been installed and configured, the method may include, at step 1207, finishing the process. Otherwise, to the method may include, at step 1202, transferring the installer procedure for the update program to the device. In some embodiments, the method may include, at step 1203, creating a configuration file for the update program based on the current configuration parameters for the device. At step 1204, the method may include transferring the configuration file created in step 1203 to the device. At step 1205, the method may include running the installer procedure transferred to the device in step 1202. At step 1206, the method may include retrieving and logging the results of running the installer procedure in step 1205, and then proceeds to step 1207, finishing the process.

Figure 13:
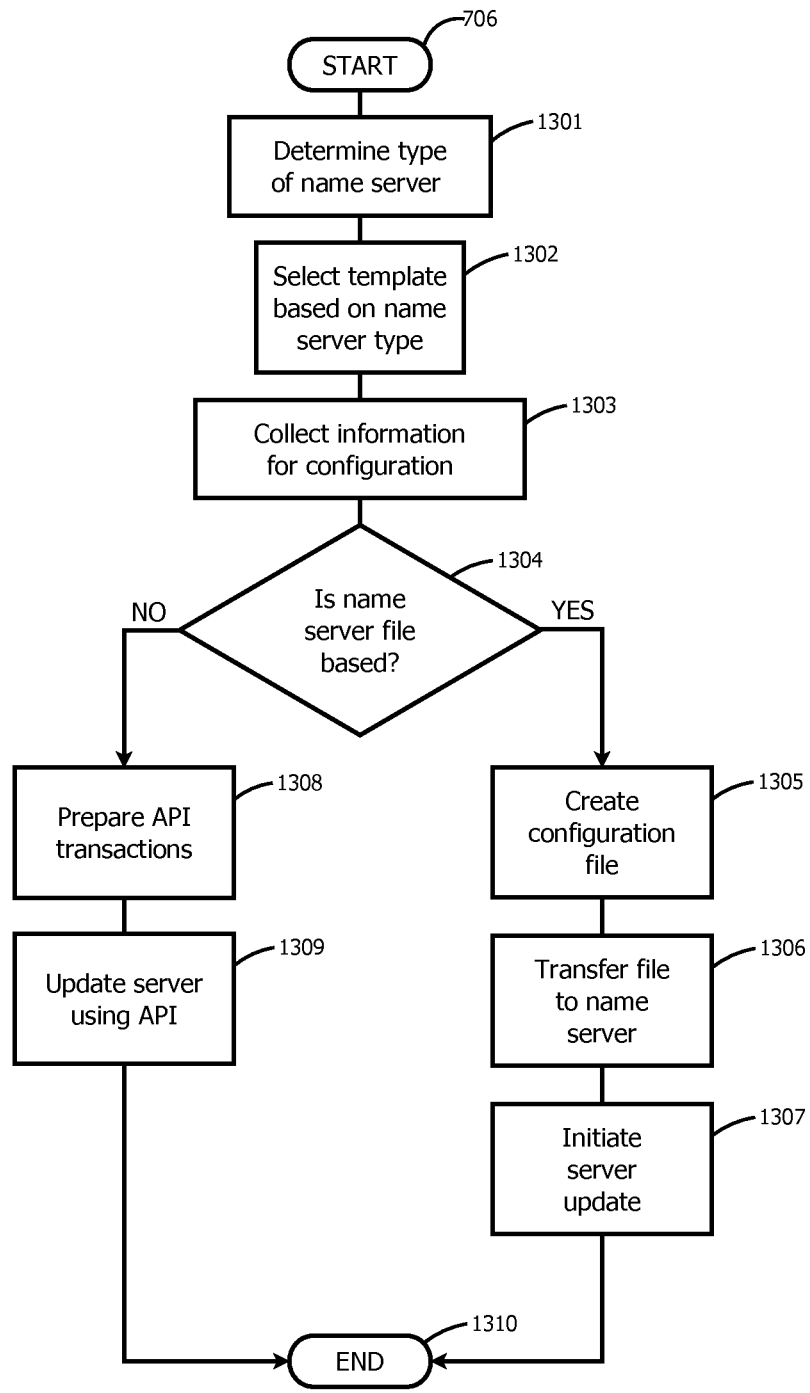
FIG. 13 is an illustrative flowchart depicting one embodiment of the steps taken to update a name server.

Referring now to FIG. 13, an illustrative flowchart depicting one embodiment of the steps taken to update a name server is shown. In some embodiments, the method includes, at step 1301, determining the operating system, name server software, and/or software version being used by the server to be updated. At step 1302, the method may include using the information collected in step 1301 to select a template for updating the name server. At step 1303, the method may include collecting the information that may be included in the update, including, e.g., the symbolic name and new network address of the device to be updated. At step 1304, the method may include using the information collected in step 1301 to determine whether the name server update may be done using a configuration file or using an Application Programming Interface (API). If the update may be done using a configuration file, the method may include, at step 1304, proceeding to step 1305, which may include creating the configuration file using the template selected in step 1302 and/or the configuration information collected in step 1303. In some embodiments, the method may include, at step 1306, transferring the file to the name server. At step 1307, the method may include initiating the update of the name server using the new configuration file transferred in step 1306. In some embodiments, at step 1310, the process may end or return to another step. If, however, at step 1304, the method determines that the update may be done using an API, the method may include proceeding to step 1308, which may include preparing the appropriate API transactions using the template selected in step 1302 and/or the configuration information collected in step 1303. At step 1309, the method may include using the API to update the name server. The method may finishes at step 1310.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Having described certain embodiments of methods and systems for virtualizing audio hardware for one or more virtual machines, it will now become apparent to one of skill in the art that other embodiments incorporating the concepts of the disclosure may be used.

What is claimed is:

1. A system for managing remote devices via a computer network, comprising:
   a management server comprising one or more processors to:
      monitor and manage, via the computer network, one or more remote devices each associated with a network address provided by one or more address provisioning servers; and
      identify, based on a type of a name server, a template for configuration of an update program to update a translation from a symbolic name to the network address stored in the name server;
   a detection module to detect a change in the network address of a remote device of the one or more remote devices; and
   an update module to:
      receive, from the management server, the template identified based on the type of the name server;
      receive, from the management server, authentication information that authorizes the update module to update the translation stored in the name server;
      configure, using the received template for the type of the name server and the received authentication information for the name server, the update program to update the translation stored in the name server; and
      update, via the update program configured with the template and the authentication information, the translation stored in the name server responsive to the change in the network address detected by the detection module.

2. The system of claim 1, wherein said one or more address provisioning servers are DHCP servers.

3. The system of claim 1, wherein the name server includes a DNS server.

4. The system of claim 1, wherein said detection module and said update module execute on the remote device.

5. The system of claim 1, wherein said detection module and said update module execute on said one or more address provisioning servers.

6. The system of claim 1, wherein said detection module and said update module are installed and configured automatically by said management server.

7. The system of claim 1, wherein said update program uses a control file template retrieved from said management server configured to provide a control file to update the name server.

8. A method for managing remote devices via a computer network, comprising:
   monitoring and managing, by a management server via the computer network, one or more remote devices each associated with a network address provided by one or more address provisioning servers;
   identifying, by the management server, based on a type of a name server, a template for configuration of an update program to update a translation from a symbolic name to the network address stored in the name server;
   detecting, by a detection module, a change in the network address of a remote device of the one or more remote devices;
   receiving, by the update module from the management server, the template identified based on the type of the name server;
   receiving, by the update module from the management server, authentication information that authorizes the update module to update the translation stored in the name server;
   configuring, by the update module using the received template for the type of the name server and the received authentication information for the name server, the update program to update the translation stored in the name server; and
   updating, via the update program configured with the template and the authentication information, the translation stored in the name server responsive to the change in the network address detected by the detection module.

9. The method of claim 8, further comprising:
providing said network address to said one or more remote devices using DHCP.

10. The method of claim 8, further comprising:
providing said translation using DNS.

11. The method of claim 8, further comprising:
providing said detecting and updating the remote device.

12. The method of claim 8, further comprising:
providing said detecting and updating on said one or more address provisioning servers.

13. The method of claim 8, further comprising:
automatically installing and configuring, by said management server, the update program.

14. The method of claim 8, further comprising:
retrieving, from said management server, a control file template configured to provide a control file to implement said updating of the name server.

15. A system for managing remote devices via a computer network, comprising:
   a management server configured to:
      monitor and manage, via the computer network, one or more remote devices each associated with a network address provided by one or more address provisioning servers;
      determine a change in the network address of a remote device of the one or more remote devices;
      select, responsive to identifying a type of a name server, a template for configuration of an update program to update a translation from a symbolic name to the network address stored in the name server;
      obtain authentication information that authorizes the update module to update the translation stored in the name server;
      configure, using the received template for the type of a name server and the received authentication information for the name server, the update program to update the translation stored in the name server; and
      transmit, to the at least one remote device or address provisioning server, the update program configured with the template and the authentication information to update the translation stored in the name server responsive to the change in the network address detected by the detection module.

16. The system of claim 15, wherein the management server is further configured to:
obtain information corresponding to the determined change in the network address.

17. The system of claim 16, wherein the update program is further configured to:
create, based on the information and the template, a configuration file used to update the name server.

18. The system of claim 15, wherein the management server is further configured to:

automatically install and configure, on the at least one remote device, software configured to detect the change in the network address and update the name server based on the template.

* * * * *